(12) United States Patent
Joe et al.

(10) Patent No.: US 9,866,530 B2
(45) Date of Patent: Jan. 9, 2018

(54) METHOD AND APPARATUS FOR PROVISION OF SECURE CONNECTION

(71) Applicant: Zyxel Communications, Inc., Anaheim, CA (US)

(72) Inventors: Steven H. Joe, Coto de Caza, CA (US); Shawn Rogers, Anaheim, CA (US); Tri Nguyen, Corona, CA (US)

(73) Assignee: Zyxel Communications, Inc., Anaheim, CA (US)

( * ) Notice: Subject to any disclaimer, the term of this patent is extended or adjusted under 35 U.S.C. 154(b) by 0 days.

(21) Appl. No.: 14/875,544

(22) Filed: Oct. 5, 2015

(65) Prior Publication Data
US 2017/0099259 A1    Apr. 6, 2017

(51) Int. Cl.
*H04L 29/06*    (2006.01)
*H04W 12/02*    (2009.01)

(52) U.S. Cl.
CPC ......... *H04L 63/0272* (2013.01); *H04W 12/02* (2013.01)

(58) Field of Classification Search
CPC ...... H04W 48/18; H04W 84/12; H04L 63/08; H04L 63/0272
USPC ............................................... 726/12, 14, 15
See application file for complete search history.

(56) References Cited

U.S. PATENT DOCUMENTS

| | | | | |
|---|---|---|---|---|
| 7,624,437 B1 * | 11/2009 | Fagundo | ............ | H04L 12/4641 713/153 |
| 7,808,974 B2 * | 10/2010 | Ying | ................... | H04L 63/0272 370/352 |
| 8,339,991 B2 * | 12/2012 | Biswas | ............... | H04L 29/1232 370/254 |
| 8,639,935 B2 * | 1/2014 | Raleigh | ............ | G06Q 10/06375 370/464 |
| 8,935,759 B2 * | 1/2015 | Weizman | .......... | H04L 29/12028 726/17 |
| 9,439,240 B1 * | 9/2016 | Shipley | ................... | H04W 8/20 |

(Continued)

OTHER PUBLICATIONS

Optimal customer provisioning in network-based mobile VPNs, Guo et al, 10.1109/MOBIQ.2004.1331714, IEEE, 2004.*

(Continued)

*Primary Examiner* — Jahangir Kabir
(74) *Attorney, Agent, or Firm* — Berkeley Law & Technology Group, LLP

(57) ABSTRACT

A method and apparatus is shown for provision of a secure connection via a public network. In a particular implementation, a communication session may be established between an apparatus and a client device to enable the client device to receive access to one or more portions of a public network via one or more communication links. In response to receipt of a request message received from the client device, access may be established to the one or more portions of the public network using one or more identifiers from the client device to emulate the client device on the one or more portions of the public network. In response to detection of the established access to the one or more portions of the public network, an encrypted virtual private network (VPN) communication session may be established to one or more remote devices via the one or more portions of the public network.

20 Claims, 4 Drawing Sheets

(56) References Cited

U.S. PATENT DOCUMENTS

| | | | |
|---|---|---|---|
| 2011/0235624 A1* | 9/2011 | Scott | H04W 48/18 |
| | | | 370/338 |
| 2014/0155023 A1* | 6/2014 | Cole | H04L 12/5692 |
| | | | 455/405 |
| 2014/0207847 A1* | 7/2014 | van Wel | H04L 12/1435 |
| | | | 709/203 |
| 2015/0263886 A1* | 9/2015 | Wang | H04L 41/08 |
| | | | 370/254 |

OTHER PUBLICATIONS

Experimental performance evaluation of VPN implemented with strongSwan client and Cisco IOS IPSec gateway, Andelic et al, 10.1109/TELFOR.2011.6143517, IEEE, 2011.*

* cited by examiner

METHOD AND APPARATUS FOR PROVISION OF SECURE CONNECTION

FIELD

The subject matter disclosed herein relates generally to provision of a secure connection.

BACKGROUND

Many devices are capable of transmitting and receiving signal packets. In some cases, the transmitted signal packets may not be secure. For instance, the signal packets may be intercepted, and the contents thereof may be viewed. For example public Wi-Fi connections are often unsecured and signal packets transmitted over them may be unencrypted.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
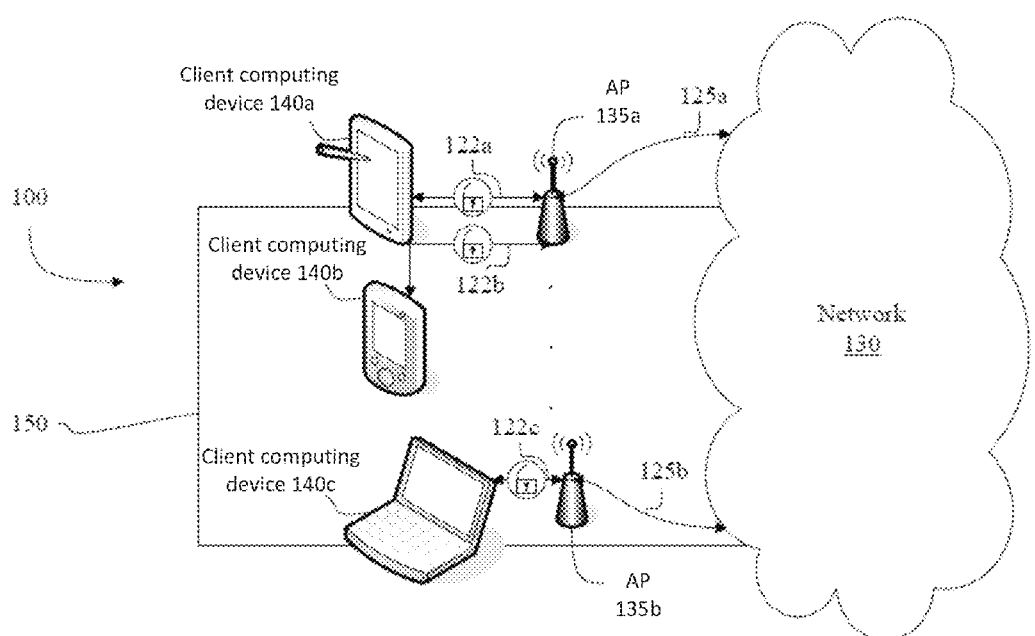
FIG. 1 is a block diagram illustrating a system according to one embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

Increasingly, human interaction and/or communication has migrated to the Internet. For example, an increasing percentage of voice conversations are carried as binary signals across the Internet (e.g., VoIP), an increasing portion of written correspondence is transmitted and received electronically (e.g., e-mail, chat, instant message, Tweets, etc.). Electronic devices have become more and more important for both personal and business use. For instance, it is estimated that as of 2013, more than 60% of Americans owned a smart phone, while more than 90% percent of adult Americans owned some sort of mobile phone. Furthermore, it has become more and more common to carry multiple electronic devices. For instance, a shopper in a grocery store may carry both a mobile telephone and a tablet computer. By way of further example, a traveler in an airport may carry both a mobile phone and a notebook computer.

To meet increasing demand for Internet access, many environments offer public access to the Internet. For instance, shopping centers, shopping malls, stores, restaurants, cafes, public and private office buildings, airports, train stations, bus stations, public transport (e.g., buses, trains, boats, airplanes, etc.), among other things, may offer open connections to the Internet. Thus, by way of example, a shopper in a shopping mall may be able to access the Internet via a public, and in some cases, open and/or unsecured, connection (e.g., a Wi-Fi access point (AP)). By way of further example, travelers, such as at an airport or train station, may also be able to access the Internet via an open (e.g., unsecured) public connection to the Internet. Etc. While offering unsecured public access to the Internet may be beneficial to users, the unsecured nature of these connections may present challenges.

For example, a user accessing the Internet via an unsecured public AP may transmit signal packets in a form that may be relatively easily intercepted and/or viewed by others. As such, potentially sensitive and/or confidential information transmitted to and/or from an unsecured public AP may be viewable by others. Thus, transmission of passwords, credit card information, and/or confidential information via an unsecured public AP may carry a risk that the sensitive information may be viewed by unintended parties.

Referring to FIG. 1, a wireless environment 150 is illustrated comprising two APs, 135a and 135b. Each of AP 135a and AP 135b may comprise to a connection (125a and 125b) to network 130 (e.g., the Internet) via a public network. As used herein, the term public network refers to a network of devices that is not limited to particular devices able to communicate with other devices on the network. In one embodiment, a public network may be accessed without a password. By contrast, a private network refers to a particular, limited set of devices able to communicate with other devices in the particular, limited set, such as via signal packets. Thus, a first public network (e.g., a LAN) may comprise a number of APs via which one or more mobile devices may access the first public network. In one implementation, a public network may also provide access to network 130 (e.g., WAN). As such, a client device, such as client computing device 140a may be able to connect to a first public network via AP 135a, and gain access to network 130, by way of example. Alternatively, a computing device may instead select a second public network (e.g., LAN) comprising AP 135b, which may also propose access to network 130.

As is illustrated in FIG. 1, and consistent with the foregoing, client computing devices 140a, 140b, and/or 140c may connect to network 130 via public connections, such as APs 135a and 135b. For clarity, FIG. 1 indicates that connections 122a, 122b, and 122c (shown with an open lock icon) are what are used to transmit and/or receive signal packets between client computing devices 140a, 140b, 140c and network 130. In some cases of transmission and/or reception of unsecured signal packets travelling between APs and client computing devices, the signal packets may be intercepted and/or viewed by other devices. For example, client computing device 140c may be capable of listening for, intercepting, and/or viewing the contents of signal packets transmitted between client computing device 140a and AP 135a. Thus, among other things, images, text, audio, and video may be viewable in their unsecured form in at least some cases. For example, unsecured passwords, unsecured instant message conversations, unsecured emails, etc. may be relatively easily viewed by unauthorized third parties in cases where signal packets are transmitted over unsecured and/or open connections (e.g., 122a).

However, in some cases, an unsecured public connection to the Internet may be a user's only or easiest option in order to access the Internet. For example, in certain indoor environments, radio signals from a cell tower (e.g., 3G, LTE, etc.) may be significantly attenuated so as to render use of such connections less than desirable. Furthermore, bandwidth limits, limitations, and/or costs may also reduce usability and/or usefulness of connections to a cell tower. For example, a traveler stopping at an airport may be outside of a zone of coverage for the traveler's cellular service plan, and thus, use of "roaming" cellular and/or "data" service may be cost-prohibitive. In cases such as the foregoing, and many others, access to the Internet via an unsecured public connection may be a user's only reasonable option for accessing the Internet. There may therefore be a need for a method and/or apparatus for securing signal packets transmitted and/or received via a public connection to the Internet.

One option for securing signal packets comprises use of a virtual private network (VPN) connection. In one example, a computing device accessing the Internet via an unsecured public connection (e.g., AP), may log into a VPN, which may enable the computing device to take advantage of the security mechanisms of a private network while nevertheless being remote to the private network. In one such case, signal packets transmitted from a computing device on a VPN may be encrypted prior to transmission via a public connection to protect transmitted signal packets. Similarly, received signal packets may also be encrypted. However, traditional approaches to opening and/or maintaining a secure connection to a VPN may present certain challenges.

A virtual private network (VPN) refers to a network that extends a private network across a public network (e.g., the Internet). Thus, a computing device may be able to use a VPN to securely transmit and/or receive signal packets across a public network as if it were directly connected to a private network, including benefiting from the security and/or management policies of the private network. For instance, a VPN may enable a remote device to more securely (e.g., more privately and/or more securely) communicate via a local network. A router may allow network communications in the form of network transmissions (e.g., signal packets and/or frames), for example, to occur from a remote device to a VPN server on a private network. A remote device may be authenticated and a VPN server, for example, may create a special route between a private network and the remote device through an intervening router. However, a route may be generated and/or also regenerate if the remote device is power cycled, for example. Also, a VPN typically may affect a single remote device, for example, in some situations.

For example, traditionally, connections to (or communication sessions with) a VPN, such as a business' private network, may be complicated to set up, maintain, and/or run on computing devices. Indeed, in some cases, trained IT staff may set up a VPN for a private network, potentially including, among other things, installing, configuring, and/or managing VPN software on devices authorized to access a VPN network. Such expertise (and/or access thereto) may be beyond reach of many users.

Additionally, access to a VPN typically may be performed through software installed on a computing device for which VPN access is desired. As such, users who may desire VPN access for multiple devices may need to install and/or configure separate installations of VPN software and/or establish separate and independent connections to a VPN on respective devices. In many cases, separate installations, configuration, and/or management of VPN software on a plurality of devices may increase a complexity of such systems. As such, there may be a desire for a method and/or apparatus to allow secured access to the Internet via an unsecured public connection (e.g., AP) that may allow one or more devices to take advantage of secured access via typical unsecured public access points, for example.

Referring again to FIG. 1, which illustrates a wireless environment 150 comprising a plurality of client computing devices, 140a, 140b, and 140c, transmitting signal packets via unsecured connections 122a, 122b, and 122c, respectively, to APs 135a and 135b, and on to connections 125a and 125b to network 130, it is noted that at a number of points along the path signal packets may be intercepted. For instance, in some cases, a given access point, such as AP 135b, may be malicious, and signal packets received may be intercepted. Furthermore, though in many cases connections 125a and 125b may be secure (e.g., wired connections between a trusted AP and network 130), it is possible that connections 125a and 125b may also be compromised, and unsecured signal packets that traverse connections 125a and 125b may be intercepted. As such, a method of securing transmission and reception of signal packets sent between a client device and a destination on network 130 may be desired.

One approach to the foregoing may comprise a device acting as an intermediary between one or more client devices and a public network. For instance, in one example, a stand-alone programmable access device may act as an intermediary between one or more client devices and an unsecured public connection to the Internet. In one embodiment, a device may provide one or more client devices a secure connection, such as via a VPN, to the Internet, using an unsecured public connection.

For convenience, a device for providing, for one or more client devices, a secure communication session via a public network is referred to herein as a securing device. In one embodiment, a securing device may be capable of acting as both a client device and an access point simultaneously, or substantially simultaneously. For instance, for one or more client devices desiring a secure connection to the Internet, a securing device may be capable of acting as an AP, while concurrently acting as a client device relative unsecured public connections to the Internet. An example securing device may thus be able to act as an AP and facilitate a connection to one or more client devices. A securing device may also be able to use identifiers of one or more client devices to emulate the one or more client devices as to a public connection to the Internet. As such, securing device may be capable of exchanging one or more signal packets with one or more client devices as an AP while concurrently, or substantially concurrently, exchanging one or more signal packets with a public connection to the Internet while emulating the one or more client devices.

In one embodiment, a securing device may be capable of establishing a secured communication session (e.g., VPN connection) via a public network. Establishment of a secured communication may comprise, by way of non-limiting example, establishment of a communication session between a client device and a securing device (e.g., such as via a graphical user interface (GUI)), connection of the securing device to a public network, and/or establishment of a secured communication session between the securing device and one or more remote servers via the public network.

Figure 2:
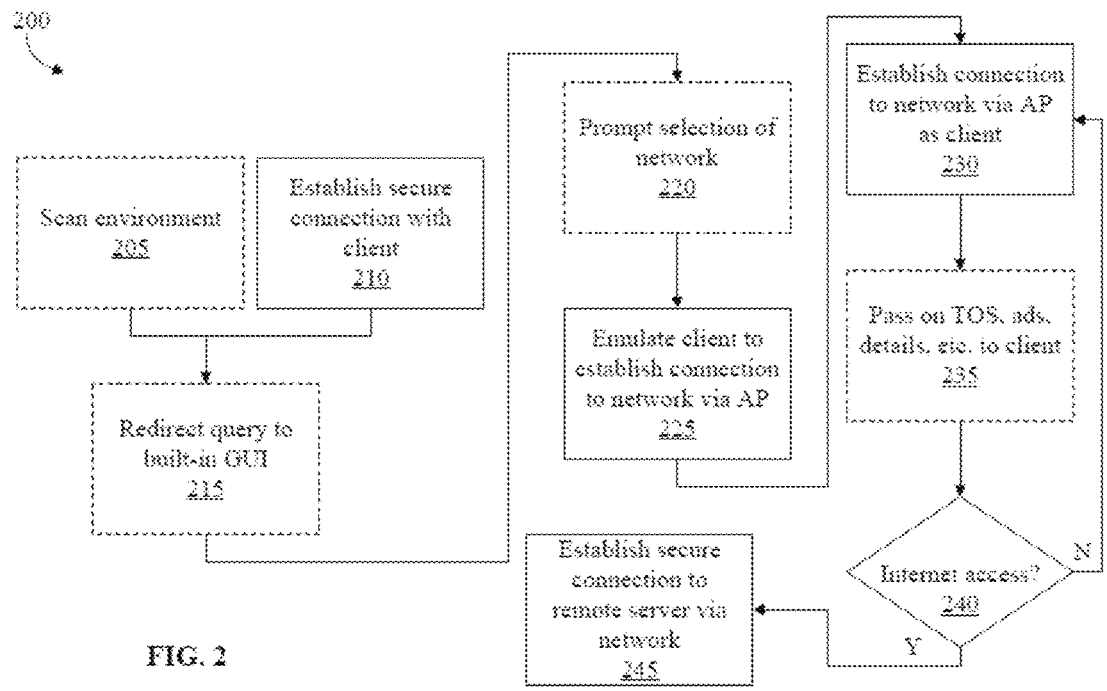
FIG. 2 is a flow diagram for provision of a secure connection according to one embodiment.

FIG. 2 illustrates a method embodiment 200 for securing signal packets transmitted between a client device and a desired destination device on a WAN, such as network 130 illustrated in FIG. 1. At block 205, an environment may be scanned, such as by a securing device, to determine a presence of one or more networks and/or one or more communication links to one or more portions of one or more networks (e.g., via a connection to a Wi-Fi access point). For example, a securing device, such as securing device 302 in FIG. 3A, may scan an environment containing one or more available network connections, such as to a WAN (e.g., the Internet). Securing device 302 may be capable of storing a list of available connections to network 330 and/or APs, such as APs 335a and 335b. As noted by the broken lines of block 205, scanning an environment may comprise an optional step. For example, in one embodiment, a securing device, such as securing device 302, may be preconfigured to establish a connection with pre-selected networks.

Returning to FIG. 2, at block 210, a connection may be established with a client. In one embodiment, a client computing device, such as client 340 in FIG. 3B, may establish a secure communication session with a securing device, such as securing device 302. FIG. 3B illustrates an embodiment in which establishment of a communication session with securing device 302 comprises providing a user name and password at a user interface element 345, by way of non-limiting example. In one case, user interface element 345 may be transmitted to client 340 in response to reception of a request message, such as a request for a webpage or website received from client 340. In another case, a connection or communication session, such as connection 321, between client 340 and securing device 302 may be established and/or secured without direct user input. For example, securing device 302 may be preconfigured to connect to client 340, such that as soon as client device 340 and securing device 302 are started in a wireless environment, a communication session 321 may be established.

Returning again to FIG. 2, at block 215, a securing device may transmit one or more prompts to a client device (e.g., a user interface may be displayed on a client device comprising one or more prompts from the securing device). For instance, a securing device, such as securing device 302 in FIGS. 3A and 3B, may transmit one or more signal packets to a client device 340, that, when received, may be used to facilitate a user interface by the client device, for example. In one case, the user interface may facilitate selection of an available network, as shall be discussed hereinafter. In another case, not shown, the user interface may facilitate reception of credentials and/or establishment of a secure communication session with securing device 302, such as was illustrated in FIG. 3B.

In one implementation, client 340 may transmit one or more signal packets, such as a request message requesting content stored on network 330 at a given IP address or URL, and securing device 302 may instead transmit one or more signal packets to client 340 for implementation of a user interface by client 340 to display one or more prompts, using known techniques, such as a captive portal technique. As should be understood the order of blocks 210, 215, and 220, which will be discussed hereinafter, is not necessarily fixed, and the present disclosure contemplates variations of these techniques to facilitate establishing secure communication sessions through one or more unsecured networks.

Returning to FIG. 2, at block 220, a user may be prompted to select one of a number of available networks. FIG. 3C illustrates one possible embodiment for selection of available networks. FIG. 3C shows client 340 with a user interface prompt 345 showing two possible networks, network 1 and network 2, corresponding to sub-network 332a and sub-network 332b, respectively. As is illustrated, in this case, the user may be provided with certain information regarding sub-networks 332a and/or 332b, including, but not limited to, approximate connection speed and/or signal strength. Other characteristics may also be displayed, including security information (e.g., one or more networks may include some form of security), price information (e.g., one or more networks may be associated with a paid service, and securing device 302 may be capable of displaying information related to the paid service), reputation (e.g., one or more networks may have a reputation based, for instance, on user reviews or professional reviews, among other things), etc. Based at least in part on selection by a user, securing device 302 may attempt to establish a communication session with the selected one or more networks, such as responsive to a selection by a user.

At block 225 in FIG. 2, a securing device may emulate a client device in order to establish a connection to a network. As was discussed above, emulation of a client device may be based, at least in part, on certain identifiers of a client device (e.g., MAC address). A securing device may be capable of capturing identifiers of a client device. In one example embodiment, a securing device may be capable of identifying a MAC address of a device, such as a client device connected to the securing device, storing the identified MAC address, and/or using the identified MAC address in communicating with an AP.

At block 230 of FIG. 2, a communication session is established with an AP based at least in part on captured identifiers of a device. For example, as shown in FIG. 3C, a network may be selected by a user. One or more signal packets may be transmitted to an AP of a selected network in order to establish a communication session with the network via the AP. In one example, the transmitted signal packets may include one or more captured identifiers of a client device, such as, for example, a MAC address of the client device. As such, in one example, an AP may operate under an assumption that rather than exchanging signal packets with a securing device, it is instead exchanging signal packets with a client. Advantageously, having a securing device emulate a client device may protect the client from potentially malicious networks, among other things.

Block 235 of FIG. 2 illustrates optional functionality that may enable a client device to gain authorization to access a network, such as sub-network 332a, via an AP, such as AP 335a. For example, some networks may require that client devices accept network terms of service (TOS), watch an advertisement, click on a button, or other such activity to gain access to the network. FIG. 3D illustrates one embodiment, in which client 340 has established a communication session 321 with secured device 302, which has established an unsecured communication session 322 to AP 335. AP 335 prompt for a form of authorization (e.g., acceptance of TOS, a user name and/or password, etc.) prior to allowing client devices to use it to access a network. Thus, for example, AP 335 may redirect clients to a webpage for, for example, accepting TOS, viewing advertisements, entering log-in credentials such as a name and/or password, user prompts, etc., prior to transmitting signal packets from client devices on to network 330. In one embodiment, securing device 302 may be capable of passing signal packets containing authentication information on to a client device, as illustrated by the broken line of sample signal packets 365 in FIG. 3D. In some cases, therefore, securing device 302 may operate transparently as an intermediary device (e.g., by emulating a client device such as client 340).

Block 240 of FIG. 2 indicates a determination of whether or not authentication has succeeded (such as explained relative to block 240), such as with AP 335 in FIG. 3D. If, for example, it is determined that access has not been granted to the Internet, such as via AP 335 of FIG. 3D, then further attempts to connect to a network may be made. For instance, in one embodiment, instructions may return to block 230. In another embodiment not illustrated in FIG. 2, a user may be prompted to select another network, such as via a user interface, as shown in blocks 215 and 220. If access to the Internet is detected at block 240, then a securing device may attempt to establish a secure connection to a remote server, such as a remote VPN server, via a public network, such as subnetwork 332a in FIGS. 3A, 3B, and 3C.

Figure 3A:
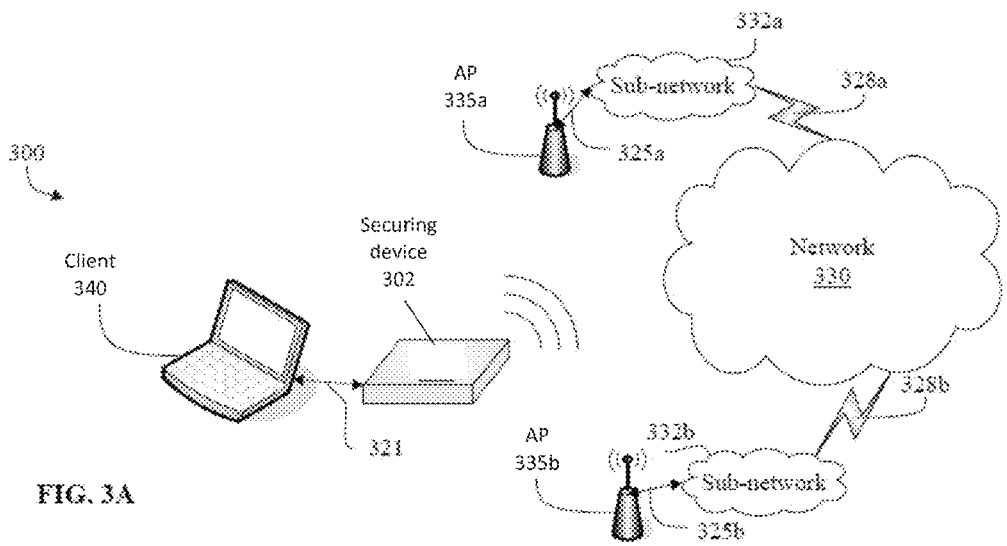
FIGS. 3A-3E illustrate operation of a securing device in an environment according to one embodiment.
Figure 3B:
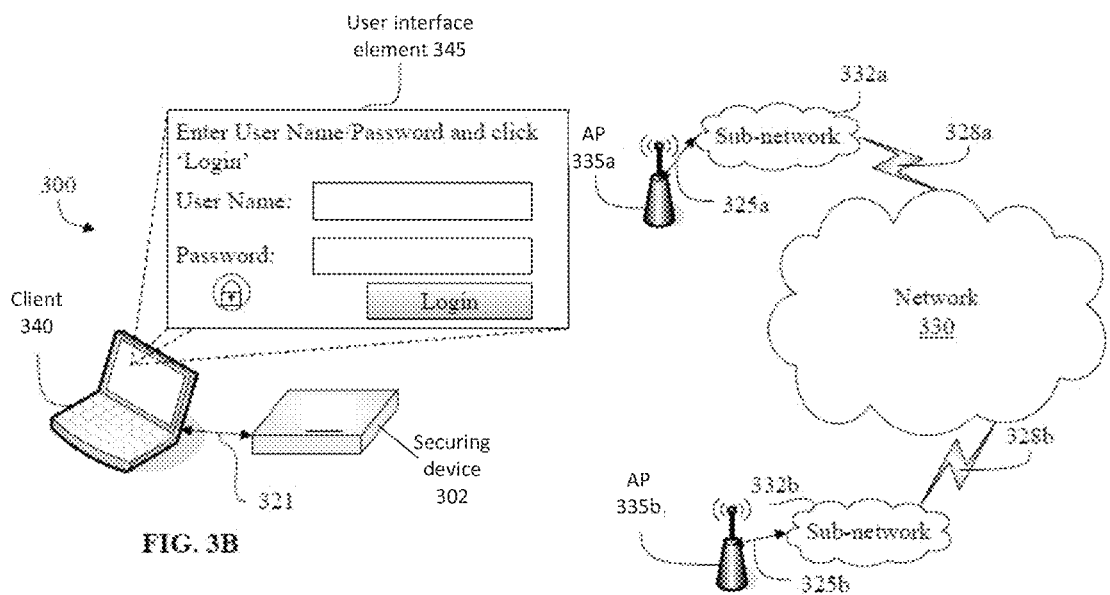
Figure 3C:
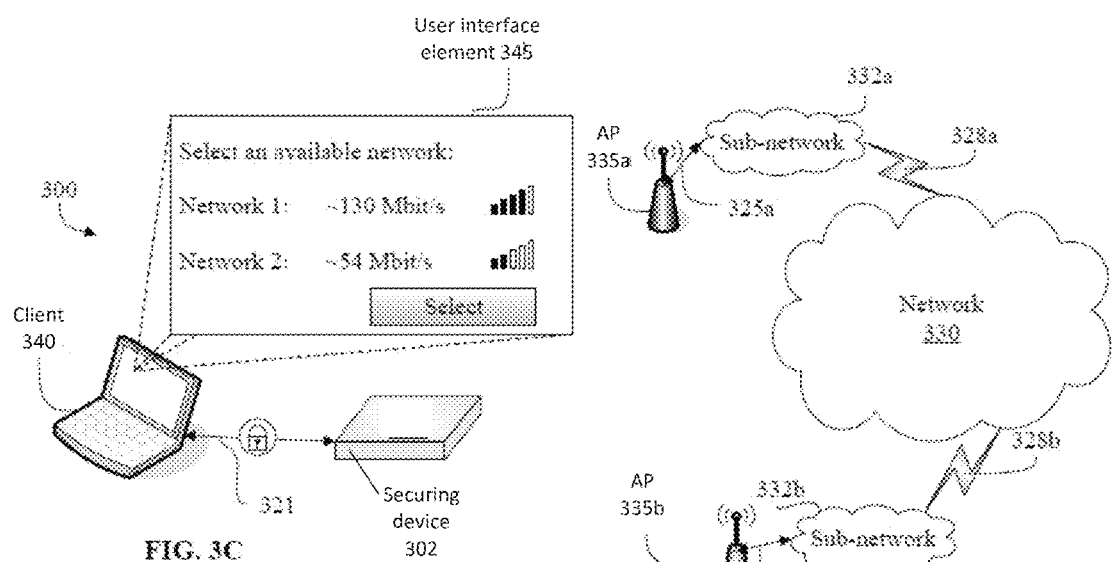
Figure 3D:
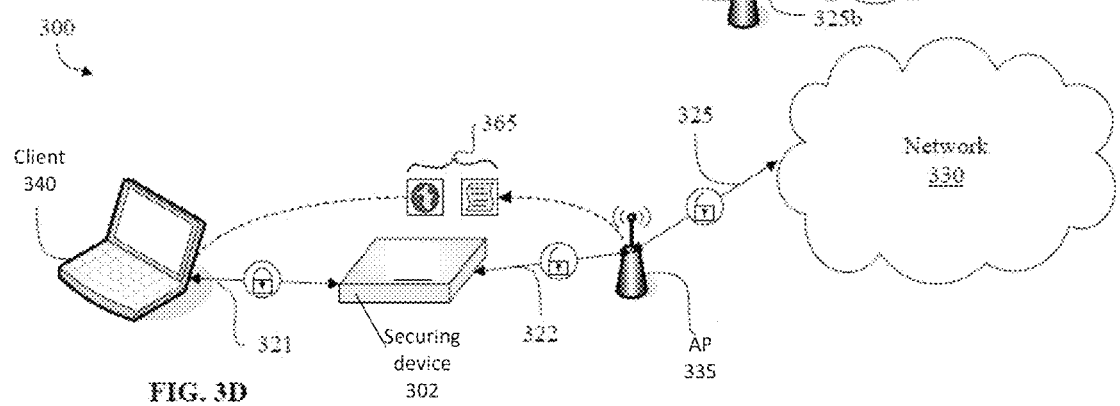
Figure 3E:
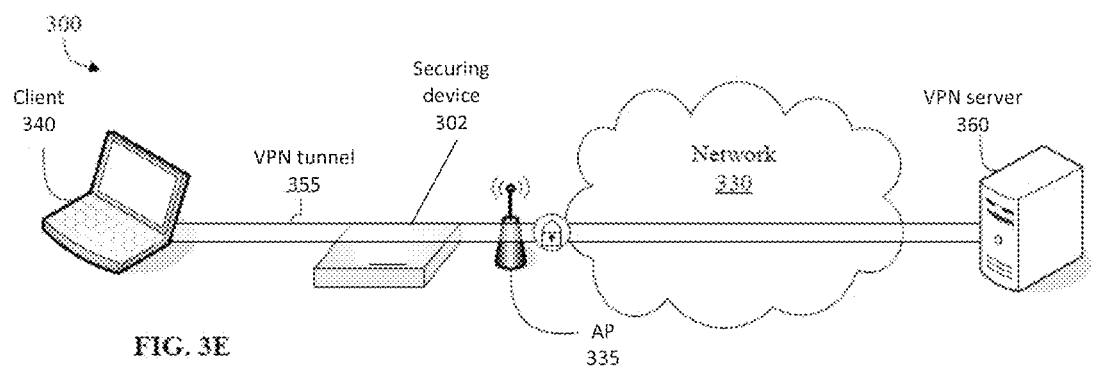

Block 245 of FIG. 2 is directed to establishing a secure connection to a remote server via an intermediary network, such as subnetwork 332a in FIGS. 3A, 3B, and 3C. FIG. 3E illustrates one embodiment consistent with block 245 in which a secured communication session (e.g., VPN tunnel 355) is established between client 340 and VPN server 360. Secured VPN tunnel 355 refers to a secured (e.g., encrypted) communication session between two or more devices. In the case of FIG. 3E, signal packets transmitted between client 340 and remote VPN server 360 may be encrypted consistent with one or more security policies of VPN server 360. As such, signal packets transmitted between client 340 and VPN server 360 may be secured against unauthorized access, including intercepting and accessing content stored in and/or represented by signal packets. Advantageously, one securing device embodiment, such as securing device 302, may provide authorized client devices access to a secured private network via one or more public networks.

Figure 4:
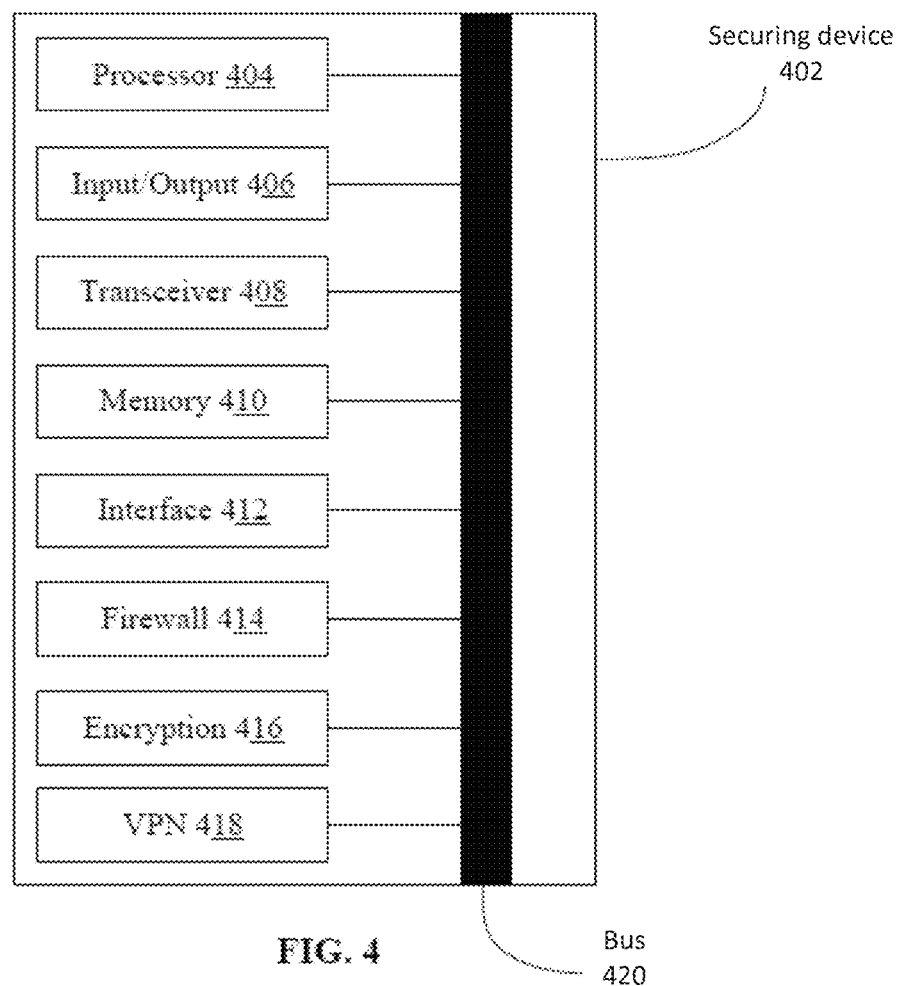
FIG. 4 is a block diagram illustrating a securing device according to one embodiment.

FIG. 4 illustrates a securing device 402 according to one embodiment. Securing device 402 may comprise a number of components, parts, and/or portions that may enable embodiments similar to that discussed above. In one embodiment, securing device 402 may comprise one or more processors 404 (referred to hereinafter by the singular "processor" without limitation) electrically coupled to a bus 420. Also, an input/output 406, one or more transceivers 408 (referred to herein by the singular "transceiver" without limitation), one or more memories 410 (referred to by singular "memory"), an interface 412, a firewall 414, encryption 416, and/or VPN 418 components may also be electrically coupled to bus 420. As should be understood, a bus, such as bus 420, refers to a communication bus for transfer of signals, states, and/or computing values between components of one or more devices.

Processor 404 refers to a combination of hardware, software, and/or firmware (but not software per se) for executing instructions, such as instructions stored in memory 410. In one embodiment, processor 404 may comprise digital circuits to perform at least a portion of a computing procedure and/or process. By way of example, but not limitation, processor 404 may comprise one or more processors, such as controllers, microprocessors, microcontrollers, application specific integrated circuits, digital signal processors, programmable logic devices, field programmable gate arrays, the like, or any combination thereof In implementations, processor 404 may perform signal processing to manipulate signals and/or states, to construct signals and/or states, etc., for example. In one embodiment, one or more instructions may be executed by processor 404 in order to enable functionality to secure a connection to the Internet via a public AP, such as described above. Use of terms such as "processing," "computing," "calculating," "determining," "emulating," "establishing," "obtaining," "identifying," "selecting," "generating," and/or the like may be used in the specification, such as in relation to processes and/or functionality, and may be accomplished using one or more processors, such as processor 404.

Input/Output component 406 refers to a combination of hardware, software, and/or firmware components (but not software per se) for communication of signals, states, and/or computing values between one or more devices and/or peripherals. For instance, in one embodiment, an input/output component, such as input/output 406, may facilitate communication of signals, states, and/or computing values between a securing device 402 and a peripheral, such as a keyboard, mouse, printer, etc.

Transceiver component 408 refers to a component for transmitting and/or receiving communications, including both wired and wirelessly, such as via electromagnetic radiation including, but not limited to, Wi-Fi (e.g., IEEE 802.11 standards), Bluetooth (e.g., IEEE 802.15.1), Zigbee (e.g., IEEE 802.15.4), and/or other standards to be determined and/or used in the future. Transceiver 408 may enable wireless communication with one or more devices, such as one or more client devices and/or one or more access points of one or more networks.

Memory 410 refers to a non-transitory storage medium, and is not necessarily representative of a given storage mechanism. Memory 410 may comprise, for example, primary memory and secondary memory. Further, memory 410 may comprise additional memory circuits, mechanisms, or combinations thereof. Memory 410 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 410 may be utilized to store instructions, such as for a program. Memory 410 may also comprise a memory controller for accessing a computer readable-medium that may carry and/or make accessible content, which may include code, and/or instructions, for example, executable by processor 404 and/or some other unit, such as a controller and/or processor, capable of executing instructions, for example.

Under direction of processor 404, memory, such as memory cells storing physical states, representing, for example, a program, may be executed by processor 404 and generated signals may be transmitted via transceiver 408, such as to an unsecured public connection to the Internet, for example. Processor 404 may also receive digitally-encoded signals from an AP and/or a client device.

Interface component 412 may be capable of facilitating an interface with a user. In one embodiment, interface 412 may enable display of one or more indicators so as to be understood by users. For example, interface 412 may facilitate illumination of one or more lights or LEDs to indicate, for example, operation of securing device 402, transmission and/or reception of signal packets, and a secured connection, among other things. Interface 412 may work in concert with processor 404 and/or memory 410 to enable transmission of indicators to users.

Firewall component 414 refers to a component for providing a barrier to control signal packets entering and leaving securing device 402. Firewall may comprise any suitable combination of hardware, software, and/or firmware (except for software per se). In one embodiment, a firewall component, such as firewall component 414, may be capable of inspecting signal packets and determining whether or not certain packets may be potentially malicious and may filter, modify, and/or block signal packets.

Encryption component 416 refers to a component for encrypting and/or decrypting signal packets. In one embodiment, an encryption component, such as encryption component 416 may be capable of receiving one or more signal packets in an unencrypted form, and outputting the received one or more signal packets in an encrypted form. Similarly, encryption component 416 may be capable of receiving one or more encrypted signal packets, and outputting one or more unencrypted signal packets based, at least in part, on the received one or more encrypted signal packets.

VPN component 418 refers to a component for extending a private network across a public network, such as the Internet. In one embodiment, VPN component 418 may be capable of establishing a secure communication session with a remote VPN server and transmitting to, and receiving from, encrypted signal packets.

In operation, the components and parts of securing device 402 may enable communication with one or more client devices and/or with one or more APs. For instance, securing device may be capable of establishing a communication session with a client device, via transceiver component 408. In one case, transceiver component 408 may receive one or more signal packets from a client device. The received one or more signal packets may be transmitted to processor 404 and based at least partly on instructions in memory 410, may determine that the client device wishes to establish a communication session with securing device 402. Based at least partly on the received one or more signal packets, a communication session with the client device may be established. This process may involve a plurality of components of securing device 402, including, but not limited to, processor 404, transceiver component 408, memory 410, and bus 420.

Securing device 402 may receive a request message from a client device, such as via transceiver component 408. For example, after establishing a communication session with a client device, the client device may transmit an IP address or URL to securing device 402, such as to access a webpage or a website, among other things. Responsive to the received request message, securing device 402 may instead transmit one or more signal packets to the client device to facilitate display of a website or webpage hosted on securing device 402, and/or present a user interface to a user of the client device (e.g., one or more prompts). The process of receiving a request message and/or transmitting signal packets (e.g., comprising one or more prompts) to a client, such as to a facilitate a user interface, by way of non-limiting example, may be performed at least partly by processor 404, transceiver component 408, memory 410, and/or encryption 416.

In one embodiment, a user interface may be displayed by a display of a client device and may, among other things, prompt selection of an available network. In one embodiment, securing device 402 may perform an initial scan of a wireless environment that may comprise one or more available networks. A list of available networks may be created and/or stored, such as within memory 410 of securing device 402. In another embodiment, a scan of a wireless environment may be performed substantially concurrently with display of a user interface. In one example, further scans of a wireless environment may be performed at intervals and/or responsive to a request from client device (e.g., selection of a refresh button). Responsive to reception of one or more signals from a client device, such as signals indicating a selected one of one or more available networks, securing device 402 may establish a communication session with a selected network. In one embodiment, securing device 402 may use one or more identifiers from a client device to emulate (e.g., spoofing) the client device as to an AP of a selected network. Thus, when securing device 402 emulates a client device, an AP may believe that signal packets are being exchanged directly with a client device, rather than through an intermediary device, such as securing device 402. As such, in one embodiment, securing device 402 may be capable of establishing a communication session with a public network using one or more identifiers from a client device to emulate the client device on a public network.

Emulating a client device may comprise one or more aspects. For example, securing device 402 may emulate a client device by creating and/or modifying signal packets to include identifiers, such as an IP address, a media access control (MAC) address, among other things, such that an AP of a network operates under the assumption that it is exchanging signal packets with a client device, rather than an intermediary device, such as securing device 402. In one embodiment, one or more of processor 404, transceiver component 408, memory 410, and encryption component 416 may be used at least in part to perform the foregoing processes.

In one embodiment, and consistent with the foregoing explanation, once securing device 402 establishes a communication session with a network, it may be desirable to secure (e.g., encrypt) signal packets that are transmitted and/or received via the network. In one implementation, securing device 402 may, without direct input from a user, establish a secured communication session with a remote server, such as a remote VPN server to enable secure transmission of signal packets via a network. For example, based, at least in part, on one or more settings or connection characteristics, securing device 402 may transmit signal packets to a remote VPN server to establish a connection to a private network associated with the remote VPN server. In a private network, such as via a remote VPN server, transmission and/or reception of signal packets may be performed substantially in accordance with one or more security settings of the private network. For example, in one case, a remote VPN server and its private network may encrypt and/or decrypt signal packets according to a certain encryption scheme (e.g., an RSA cryptosystem), and as such, signal packets transmitted between a securing device (e.g., securing device 402) and the remote VPN server may be encrypted consistent with the relevant encryption scheme. Thus, in one embodiment, one or more signal packets transmitted by a client device may be encrypted consistent with an encryption scheme of a VPN and transmitted via a network, such as a public network. Similarly, one or more encrypted signal packets transmitted by a remote VPN server via a network, such as a public network, may be received by a securing device, such as securing device 402, and transmitted to a client device. Thus, in an implementation where a public network is used to access a VPN, securing device 402 may establish an encrypted VPN communication session to one or more remote devices via the public network. At least one or more of processor 404, transceiver 408, memory 410, encryption 416, and VPN 418 may be used at least in part with embodiments such as those discussed above.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
    one or more transceivers comprising hardware; and
    one or more processors to:
        establish a communication session with a client device using the one or more transceivers, the apparatus to provide the client device access to one or more portions of a public network using one or more communication links, wherein the client device is physically separate from the apparatus and the apparatus is intermediary between the client device and a network device on the public network;
        process a request message received from the client device comprising an external address, to create a session with the network device;
        responsive to the request message, initiate transmission, to the client device, of one or more prompts to provide additional parameters through a user interface;
        establish, using the one or more transceivers, the access to the one or more portions of the public network by creating and/or modifying signal packets to include one or more identifiers from the client device to emulate the client device on the one or more portions of the public network, wherein the one or more identifiers comprise at least a Media Access Control (MAC) address of the client device and the one or more identifiers are used to establish a communication session with the network device;
        responsive to detection of the established access to the one or more portions of the public network, initiate an encrypted virtual private network (VPN) communication session to one or more remote devices using the one or more portions of the public network and applying packets controlled by at least one firewall component of the apparatus; and
        establish a secure VPN tunnel between the client device and one or more remote devices through the network device.

2. The apparatus of claim 1, wherein the one or more processors are further to perform, using the one or more transceivers, a scan of a wireless environment.

3. The apparatus of claim 2, wherein the one or more processors are further to store a list of available networks detected in the wireless environment in a memory.

4. The apparatus of claim 1, wherein the one or more processors are further to capture the one or more identifiers of the client device in a memory.

5. The apparatus of claim 1, wherein the request message comprising an external address is to correspond to an Internet Protocol (IP) address or a Uniform Resource Locator (URL) of a webpage.

6. The apparatus of claim 1, wherein the one or more processors are further to transmit, using the one or more transceivers, at least a portion of a stored list of available networks to the client device.

7. The apparatus of claim 1, wherein the one or more processors are further to transmit, using the one or more transceivers, log-in credentials, prompts, terms of service, advertisements, or any combination thereof received from the public network to the client device.

8. A method of transmitting signal packets over a public network using a securing device, the method comprising:
    establishing, using at least in part one or more processors of the securing device, a communication session with a client device to provide the client device access to one or more portions of a public network via one or more communication links, wherein the securing device is physically separate from the client device and an apparatus is intermediary between the client device and a network device on the public network;
    processing a request message comprising an external address from the client device, to create a session with the network device;
    responsive to the request message, initiating transmission, to the client device, of one or more prompts to provide additional parameters through a user interface;
    establishing, using the one or more transceivers, the access to the one or more portions of the public network by creating and/or modifying signal packets to include one or more identifiers from the client device to emulate of the client device on the public network, wherein the one or more identifiers comprise at least a Media Access Control (MAC) address of the client device and the one or more identifiers are used to establish a communication session with the network device;
    responsive to detection of the established access to the one or more portions of the public network, initiating a virtual private network (VPN) communication session to one or more remote devices using the one or more portions of the public network and applying packets controlled by at least one firewall component of the apparatus; and
    establishing a secure VPN tunnel between the client device and one or more remote devices through the network device.

9. The method of claim 8 further comprising scanning, with the one or more transceivers of the securing device, a wireless environment.

10. The method of claim 9 further comprising storing in a memory of the securing device a list of available networks detected in the wireless environment.

11. The method of claim 8 further comprising capturing in a memory of the securing device the one or more identifiers of the client device.

12. The method of claim 8, wherein the request message comprising an external address corresponds to an Internet Protocol (IP) address or a Uniform Resource Locator (URL) of a webpage.

13. The method of claim 8 further comprising transmitting using the one or more transceivers at least a portion of a stored list of available networks to the client device.

14. The method of claim 8 further comprising transmitting, using the one or more transceivers, log-in credentials, prompts, terms of service, advertisements, or any combination thereof received from the public network to the client device.

15. A communication device comprising:
means for establishing a communication session with a client device, wherein the communication device is physically separate from the client device and the communication device is intermediary between the client device and a network device on the public network;
means for transmitting to the client device one or more prompts to provide additional parameters through a user interface in response to reception of a request message comprising an external address from the client device to create a session with the network device;
means for establishing access to one or more portions of a public network by creating and/or modifying signal packets to include one or more identifiers from the client device to emulate the client device on the one or more portions of the public network, wherein the one or more identifiers comprise at least a Media Access Control (MAC) address of the client device and the one or more identifiers are used to establish a communication session with the network device;
means for initiating a virtual private network (VPN) communication session to one or more remote devices using the one or more portions of the public network in response to detection of the established access to the one or more portions of the public network and applying packets controlled by at least one firewall component of the apparatus; and
means for establishing a secure VPN tunnel between the client device and one or more remote devices through the network device.

16. The communication device of claim 15 further comprising means for scanning a wireless environment.

17. The communication device of claim 16 further comprising means for storing a list of available networks detected in the wireless environment.

18. The communication device of claim 15 further comprising means for capturing the one or more identifiers of the client device.

19. The communication device of claim 15 further comprising means for transmitting at least a portion of a stored list of available networks to the client device.

20. The communication device of claim 15 further comprising means for transmitting log-in credentials, prompts, terms of service, advertisements, or any combination thereof received from the public network to the client device.

* * * * *